United States Patent
Dunkl

[15] 3,665,261
[45] May 23, 1972

[54] ELECTROLYTIC CAPACITOR WITH IMPROVED ELECTROLYTE

[72] Inventor: Franz S. Dunkl, Williamstown, Mass.
[73] Assignee: Spraque Electric Company, North Adams, Mass.
[22] Filed: Sept. 25, 1970
[21] Appl. No.: 75,588

[52] U.S. Cl. .......................................... 317/230, 252/62.2
[51] Int. Cl. ............................................................ H01g 9/02
[58] Field of Search ............... 317/230, 231, 233; 252/62.2

[56] References Cited

UNITED STATES PATENTS

| | | | |
|---|---|---|---|
| 1,976,700 | 10/1934 | Lilienfeld | 317/230 X |
| 2,116,449 | 5/1938 | Robinson | 317/230 |
| 2,174,841 | 10/1939 | Robinson | 317/230 X |

*Primary Examiner*—James D. Kallam
*Attorney*—Connolly and Hutz and Vincent H. Sweeney

[57] ABSTRACT

A glycol-pentaborate electrolyte, such as those commonly employed in photoflash capacitors, is improved by the addition of 0.0025–0.006 percent chromium ions thereto in the form of $CrO_3$. The addition of said chromium ions increases the breakdown voltage therein, and practically eliminates breakdowns during the aging process.

3 Claims, 2 Drawing Figures

Formation of plain Al foil at 85°C (1.5 mA/$cm^2$)

ELECTROLYTIC CAPACITOR WITH IMPROVED ELECTROLYTE

BACKGROUND OF THE INVENTION

The instant invention relates to electrolytic capacitors, and more particularly to an improved electrolyte therefor.

In the design of a photoflash capacitor many variables must be taken into consideration, but the main consideration is to put as much capacity as possible, at a given voltage, into the available space. The size of the capacitor is determined mainly by the following variables: (a) the etch factor of the foil, (b) the formation voltage, and (c) the thickness of the spacer paper. To reduce the size of the capacitor, the etch factor of the foil should be as high as possible, the formation voltage should be as low as feasible for the given rated voltage, and the spacer paper should be as thin as possible for the rated voltage. Although variables (b) and (c) are very effective in reducing the size of the capacitor, they tend to cause an increase in the number of breakdowns during the aging process. Once the rated voltage is reached, by careful aging at the rated temperature, these capacitors perform well in service, and no further breakdowns occur. However, breakdown during aging is definitely a problem at this time.

The aging process consists mainly of oxidizing the faults in the oxide layer caused by cutting, stitching, rolling, and the like. Electrolytes used in these capacitors should have low resistivity, low viscosity, high scintillation voltage, and they must be noncorrosive to the metal of the anode and cathode. This necessarily leads to a compromise, and the forming ability is not always maintained at the desired level.

A formation curve of a common glycol-pentaborate electrolyte shows that the formation ends at a relatively low voltage. In the capacitor units, a so-called secondary growth of aluminum oxide continues slowly at this point but produces a dielectric which is not always sufficiently strong to prevent breakdowns.

Increasing the breakdown voltage of the unit eliminates a nagging problem. By breakdown voltage is meant the voltage which the capacitor will stand without permitting the passage of current within the capacitor from the film-forming electrode to the non-film-forming electrode.

It is an object of the invention to provide an electrolyte that can withstand the aging process well and has a relatively high breakdown voltage.

SUMMARY OF THE INVENTION

The present invention is concerned with a standard photoflash capacitor electrolyte, and the addition thereto of chromium ions.

Electrolytes composed of the following percentages by weight:

| | |
|---|---|
| Glycol | 60–84.9% |
| Ammonium pentaborate | 15.0–39.0% |
| Ammonium dihydrogen phosphate | 0.1–1.0% | are standard type electrolytes.

A control electrolyte of the following percentages by weight:

| | |
|---|---|
| Glycol | 69.8% |
| Ammonium pentaborate | 30.0% |
| Ammonium dihydrogen phosphate | 0.2% | was prepared, and a formation curve of it shows that formation ends at 263 volts for the experimental control unit (that is, formation of plain Al foil at 85°C and 1.5 mA/cm$^2$). Similar results were obtained by varying the proportional amounts slightly as indicated by the previously mentioned ranges.

However, the present invention adds 50 ppm chromium ion (in the form of $CrO_3$) to the above formulation with a resulting increase in the breakdown voltage. Other amounts of chromium ion were used with similar increases observed. The formation curve shows considerable improvement upon the addition of the chromium ions–420 volts is reached with practically 100 percent current efficiency.

It should be noted that a minute amount of chromium ions is enough to achieve the desired result. Also metallic chromate or dichromate salts should not be used to introduce the chromium, as these metals will cause some interfering and undesirable reactions.

Although applicant does not wish to be bound by the following, it is believed that the $CrO_3$ will oxidize the glycol, forming glycolic acid and chromous ions.

DESCRIPTION OF THE PREFERRED EMBODIMENT

Figure 1:
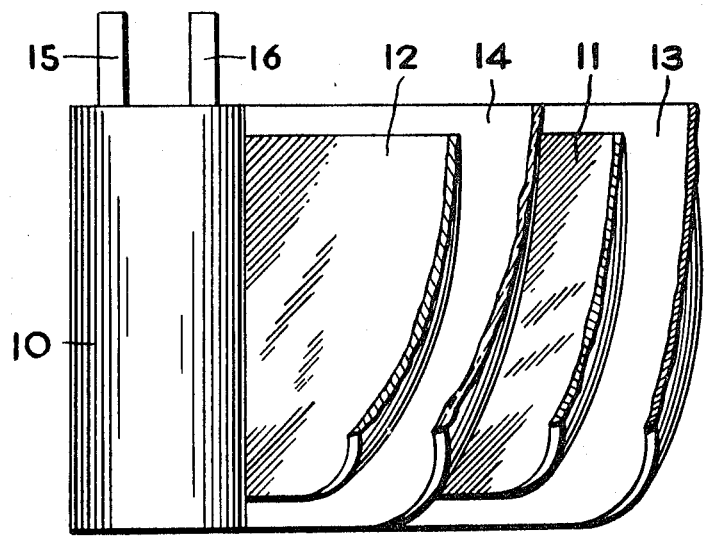
FIG. 1 shows the rolled plates of an electrolytic capacitor.

Referring to FIG. 1, there is shown a capacitor assembly 10 having a pair of electrode foils 11 and 12 separated by spacer paper 14 and 13. Electrode tabs 15 and 16 are in electrical communication with foils 11 and 12.

The rolled foil-spacer-foil system is impregnated with the electrolyte. The convolutely wound capacitor section 10 is then inserted into a suitable container and sealed.

Figure 2:
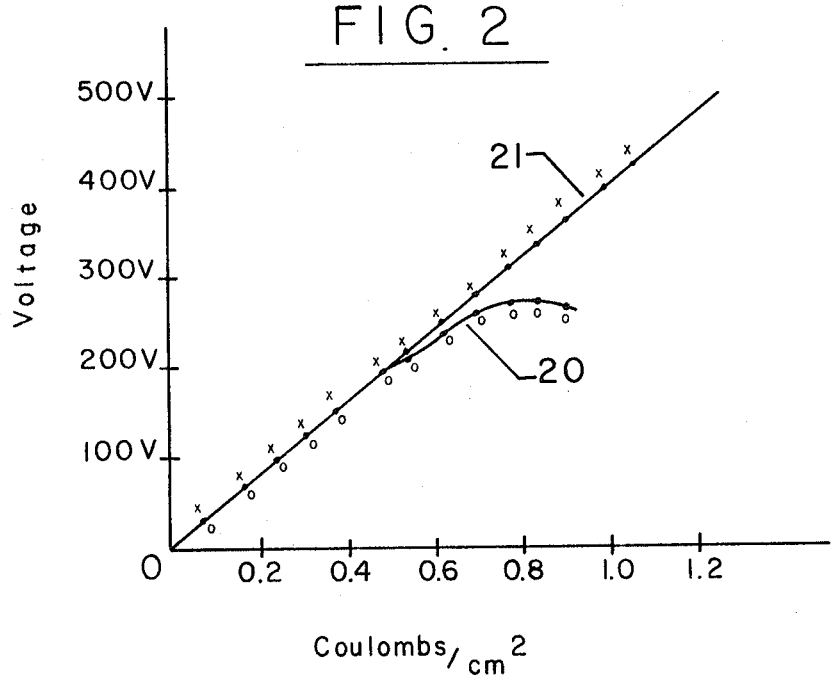
FIG. 2 shows formation curves of both the control electrolyte and the improved electrolyte.

Referring to FIG. 2, there is shown a graph demonstrating the formation curves of the standard or control electrolyte 20 and the improved electrolyte 21 having 50 ppm chromium added. In the graph, the voltage is plotted against the electrical charge applied. The two curves 20 and 21 graphically demonstrate that the improved electrolyte with 50 ppm chromium ions added reaches 420 volts with practically 100 percent current efficiency, while the formation curve for the standard electrolyte without the chromium added ends at only 263 volts. Formation curves of various other glycol-borate electrolytes were carried out, with similarly favorable results.

In order to test the effect of chromium addition to the electrolyte in practical capacitor units, a 1200 $\mu$f–360V capacitor design was selected and manufactured for experimental use. Two separate "aging" runs were carried out, each utilizing seven electrolytes with 50 ppm chromium added and seven glycol borate electrolytes without chromium added. No breakdowns occurred in either run for the improved electrolyte, while four of seven units of the standard electrolyte, and two of seven units of same broke down on successive runs.

While chromium ions are the preferred additive of this invention, and aluminum the preferred capacitor electrode, it appears that other multivalent metals, and tantalum capacitors achieve a similar favorable effect.

Modifications may be made without departing from the spirit or scope of the invention.

What is claimed is:

1. An electrolytic capacitor comprising an anode electrode of a valve metal having a dielectric oxide of said valve metal formed thereon, a cathode contact electrode, and a liquid electrolyte in contact with said electrodes, said electrolyte comprising glycol, ammonium pentaborate, and the addition thereto of 0.0025–0.006% chromium ions in the form of $CrO_3$.

2. The electrolytic capacitor of claim 1, wherein the electrolyte comprises a mixture in percent by weight of 60–84.9% glycol, 39.0–15.0% ammonium pentaborate, 1.0–0.1% ammonium dihydrogen phosphate, and 0.0025–0.006% chromium ions.

3. The electrolytic capacitor of claim 1, wherein the electrolyte comprises a mixture in percent by weight of:

| | |
|---|---|
| Glycol | 69.8% |
| Ammonium pentaborate | 30.0% |
| Ammonium dihydrogen phosphate | 0.2% |
| Chromic anhydride ($CrO_3$) | 0.005% |

* * * * *